US010817428B2

(12) United States Patent
Zhang et al.

(10) Patent No.: US 10,817,428 B2
(45) Date of Patent: Oct. 27, 2020

(54) METHOD AND ELECTRONIC DEVICE FOR ACCESSING DATA

(71) Applicant: EMC IP Holding Company LLC, Hopkinton, MA (US)

(72) Inventors: Lester Zhang, Beijing (CN); Denny Dengyu Wang, Shanghai (CN); Jian Gao, Beijing (CN); Ruiyong Jia, Beijing (CN); Chen Gong, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 15/846,738

(22) Filed: Dec. 19, 2017

(65) Prior Publication Data

US 2019/0102305 A1 Apr. 4, 2019

(30) Foreign Application Priority Data

Dec. 21, 2016 (CN) .......................... 2016 1 1193847

(51) Int. Cl.
| | |
|---|---|
| *G06F 12/00* | (2006.01) |
| *G06F 13/00* | (2006.01) |
| *G06F 13/28* | (2006.01) |
| *G06F 12/0864* | (2016.01) |
| *G06F 16/13* | (2019.01) |
| *G06F 12/0806* | (2016.01) |
| *G06F 12/0871* | (2016.01) |
| *G06F 12/0842* | (2016.01) |
| *G06F 12/1027* | (2016.01) |
| *G06F 12/0893* | (2016.01) |

(52) U.S. Cl.
CPC ...... *G06F 12/0864* (2013.01); *G06F 12/0806* (2013.01); *G06F 12/0871* (2013.01); *G06F 16/137* (2019.01); *G06F 12/0842* (2013.01); *G06F 12/0893* (2013.01); *G06F 12/1027* (2013.01); *G06F 2212/1016* (2013.01); *G06F 2212/154* (2013.01); *G06F 2212/463* (2013.01); *G06F 2212/608* (2013.01); *G06F 2212/62* (2013.01)

(58) Field of Classification Search
CPC ............. G06F 12/0806; G06F 12/0893; G06F 12/1027
USPC .......................................................... 711/118
See application file for complete search history.

(56) References Cited

U.S. PATENT DOCUMENTS

2008/0098174 A1* 4/2008 Chiba ................. G06F 12/0855
 711/118
2009/0265514 A1* 10/2009 Biles .................. G06F 12/0804
 711/154

(Continued)

*Primary Examiner* — Edward J Dudek, Jr.
*Assistant Examiner* — Sidney Li
(74) *Attorney, Agent, or Firm* — Brian J. Colandreo; Mark H. Whittenberger; Holland & Knight LLP

(57) ABSTRACT

Various embodiments of the present disclosure generally relate to a method and an electronic device for reading data. Specifically, the method comprises receiving a request for reading the target data, and in response to the request, searching for the target data by searching a data index generated in a cache for reading data. The method further comprises in response to the target data being found, providing the target data. A corresponding system, device and computer program product are also provided.

20 Claims, 4 Drawing Sheets

(56) References Cited

U.S. PATENT DOCUMENTS

| | | | |
|---|---|---|---|
| 2011/0276744 A1* | 11/2011 | Sengupta | G06F 12/0866 711/103 |
| 2013/0124794 A1* | 5/2013 | Bux | G06F 12/0246 711/103 |
| 2013/0238740 A1* | 9/2013 | Vass | H04L 67/2842 709/213 |

* cited by examiner

METHOD AND ELECTRONIC DEVICE FOR ACCESSING DATA

RELATED APPLICATIONS

This application claim priority from Chinese Patent Application Number CN201611193847.1, filed on Dec. 21, 2016 at the State Intellectual Property Office, China, titled "METHOD FOR ACCESSING DATA AND ELECTRONIC APPARATUS" the contents of which is herein incorporated by reference in its entirety.

FIELD

Various embodiments of the present disclosure generally relate to the field of computers, and more specifically, to a method and an electronic device for accessing data.

BACKGROUND

In the development of the computer technology, the access speed of the main memory is much slower than the processing speed of the central processing unit (CPU), causing the high-speed processing capability of the CPU not to be fully exploited and further affecting the work efficiency of the entire computer system. In order to mitigate the contradiction resulting from a mismatch between speeds of the CPU and the main memory, one of the conventional methods is to employ a cache memory at a storage level. The cache memory is a primary memory between the main memory and the CPU, which has a small capacity but a much higher access speed than the main memory, closing to the processing speed of the CPU. In the actual use at present, when a large amount of input/output (I/O) operations are performed on the cache memory, the problem that the system performance is dramatically reduced still might occur.

SUMMARY

According to one aspect of the present disclosure, a method for reading target data is provided. The method comprises: receiving a request for reading the target data, and in response to the request, searching for the target data by searching a data index generated in a cache for reading data. The method further comprises in response to the target data being found, providing the target data.

In some embodiments, the method further comprises updating the data index in the cache for reading data.

In some embodiments, the updating the data index in the cache for reading data comprises: in response to data being written to the cache for reading data, generating an index entry for the written data; and updating the data index using the index entry.

In some embodiments, the generating an index entry for the written data comprises: in response to the written data being renamed, generating the index entry using a file system identifier, an index node identifier and an offset.

In some embodiments, the updating the data index in the cache for reading data comprises: in response to the target data being stored in a persistent storage device, storing the target data in the cache for reading data; in response to the target data being stored in the cache for reading data, generating an index entry for the target data; and updating the data index using the index entry.

In some embodiments, the searching for the target data further comprises: in response to the target data being unfound in the cache for reading data, searching a cache for writing data.

In some embodiments, the searching for the target data further comprises: in response to the target data being unfound in the cache for writing data, searching a persistent storage device.

According to another aspect of the present disclosure, an electronic device is provided. The electronic device comprises: a processor and a memory coupled to the processor and storing instructions to be executed by the processor. The instructions, when executed by the processor, cause the electronic device to perform actions including: receiving a request for reading the target data; in response to the request, searching for the target data by searching a data index generated in a cache for reading data; and in response to the target data being found, providing the target data.

According to a further aspect of the present disclosure, a computer program product is provided. The computer program product is tangibly stored on a non-transient computer readable medium and includes machine executable instructions, and the machine executable instructions, when executed, cause a machine to execute steps of the method.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description of example embodiments of the present disclosure with reference to the accompanying drawings, the above and other objectives, features, and advantages of the present disclosure will become more apparent, in which identical reference signs generally represent identical components in the example embodiments of the present disclosure.

DETAILED DESCRIPTION OF EMBODIMENTS

Preferred embodiments of the present disclosure will be described in more detail below with reference to the accompanying drawings. Though the drawings illustrate preferred embodiments of the present disclosure, it should be appreciated that the present disclosure may be implemented in various manners rather than being limited by the embodiments described herein. Instead, these embodiments are provided to cause the present disclosure to be more through and complete and to convey the scope of the present disclosure exactly to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "one embodiment" are to be read as "at least one example embodiment." The term "another embodiment" is to be read as "at least another embodiment." The terms "first," "second," and the like, may indicate different or identical objects. Other explicit and implicit definitions may be included below.

For a storage device, in particular a large-scale storage server, it typically deals with a large amount of I/O operations, such as writing and reading data. In order to improve the efficiency of writing data, some electronic devices are configured with a cache for writing data. For example, the cache for writing data may be a persistent file data cache (PFDC) including a file data cache and data records.

However, the PFDC cannot be used to improve the read performance. For example, for a large amount of data located outside the PFDC, the electronic device, such as a storage server or the like, still requests mapping from a common block device file system (CBFS) to read data. The CBFS is typically used to provide an application program interface (API) for access, manage files, and maintain consistency of file mapping, or the like. Moreover, as for the mapping, the CBFS typically involves a plurality of operations (see for example steps 329-345 in FIG. 3) to complete the mapping. Therefore, for a server often dealing with a large amount of read operations, the conventional read manner increases burdens on the CBFS and results in a low efficiency of reading data.

In order to at least in part solve the above problem and other potential problems, example embodiments of the present disclosure propose a method and a device for reading data. According to embodiments of the present disclosure, by creating a cache for reading data, data may be directly read from the cache to improve the efficiency of reading data.

Figure 1:
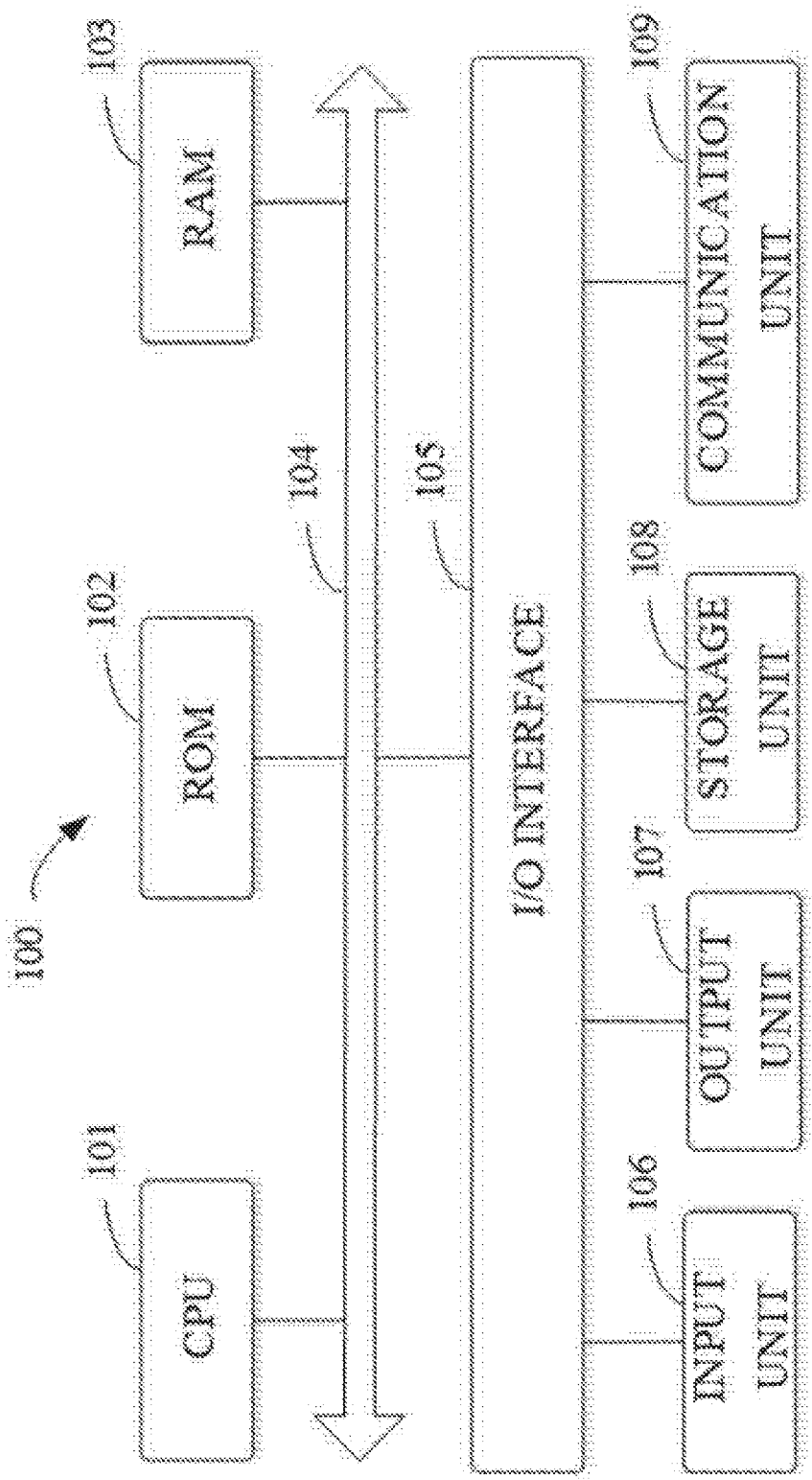
FIG. 1 is a schematic block diagram illustrating an example device for implementing embodiments of the present disclosure.

FIG. 1 is a schematic block diagram illustrating an example device for implementing embodiments of the present disclosure. As shown in FIG. 1, a device 100 includes a central processing unit (CPU) 101. The CPU 101 may execute various appropriate acts and processing based on computer program instructions stored in a read-only memory (ROM) 102 or computer program instructions loaded from a storage unit 108 to a random access memory (RAM) 103. The RAM 103 stores therein various programs and data required for operations of the storage device 100. The CPU 101, the ROM 102 and the RAM 103 are mutually connected via a bus 104. An input/output (I/O) interface 105 is also connected to the bus 104.

A plurality of components in the device 100 are connected to the I/O interface 105, including: an input unit 106, such as a keyboard, a mouse, etc.; an output unit 107, such as various types of displays, loudspeakers, etc.; a storage unit 108, such as a magnetic disk, an optical disk, etc.; and a communication unit 109, such as a network card, a modem, a wireless communication transceiver, etc. The communication unit 109 allows the device 100 to exchange information/data with other devices via a computer network, such as the Internet, and/or various telecommunication networks. The storage unit 108 may be for example the aforementioned SSD, HDD, HHD or any other types of non-volatile storage media currently known or to be developed in the future.

The device 100 for example may be a computer node in a distributed system. The RAM 103 in the device 100 may include a multi-core cache (MCC). In one embodiment of the present disclosure, target data to be read are indexed by building a HASH structure in the MCC. It would be appreciated that the HASH structure is merely used as an example but not intended to limit the embodiments of the present disclosure, and other data index structures may be employed.

In one example embodiment, the MCC may create an index entry for data (for example data block) using a file system identifier (FSID), an index node identifier (InodeNum) and an offset (Offset), and update the data index by inserting the data entry into the HASH structure. It would be appreciated that the index entry for the data may be generated using other items.

In the case that the data is written into the PFDC, the index entry for the data may be generated using for example the FSID, the InodeNum and the Offset when the data is renamed, and the index entry may be added to a data catalog to implement updating of an index catalog. In the case that the data is read from a persistent storage device, such an SSD or the like, to the MCC by mapping, the index entry for the data (for example data block) to be read may be created using a file system identifier (FSID), an index node identifier (InodeNum) and an offset (Offset), and the index entry may be added to the data catalog to implement updating of the index catalog.

In one embodiment, when the data is flushed from the MCC into the persistent data device, the MCC may remove the data catalog for the data from the HASH structure, so as to implement updating of the index catalog.

Figure 2:
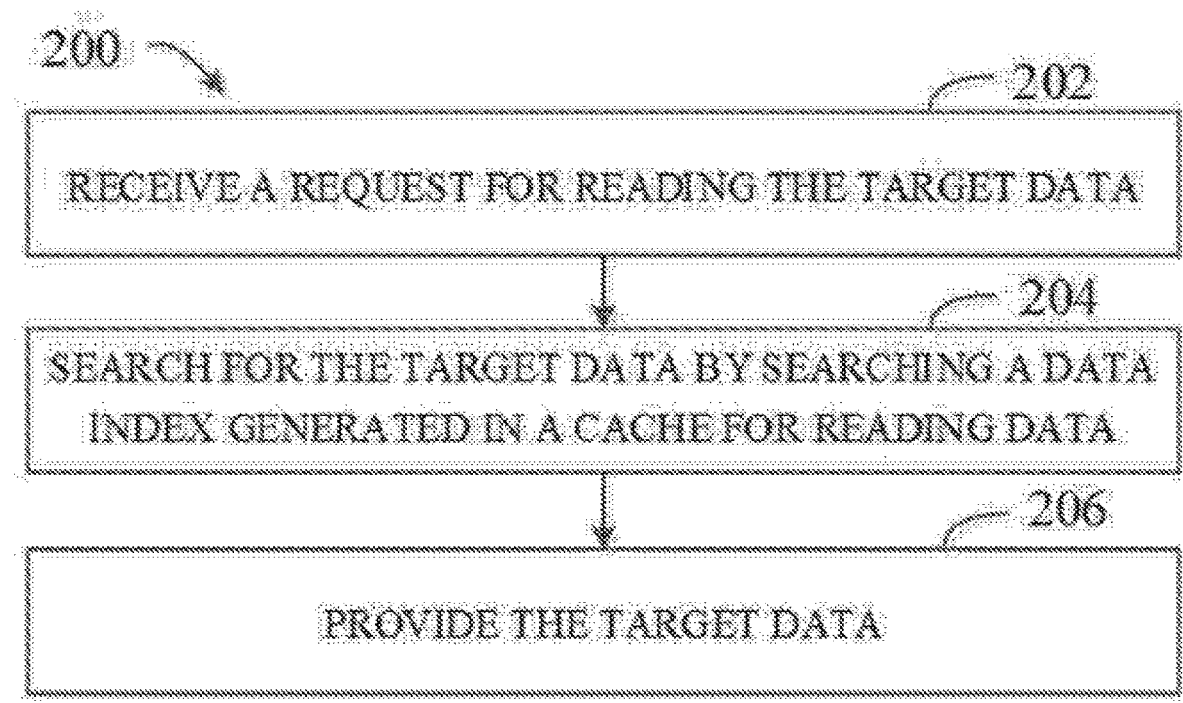
FIG. 2 is a flow chart illustrating an example method for reading data according to one embodiment of the present disclosure.

FIG. 2 is a flow chart illustrating an example method for reading data according to one embodiment of the present disclosure. In some embodiments, a method 200 for example may be implemented by machine executable instructions executed by the CPU 101 in FIG. 1, and the instructions herein are for example stored in a memory 102 and/or 103 coupled via the bus 104 to the CPU 101. In other words, in certain embodiments, the method 200 may be implemented by means of software. Alternatively or in addition, as described below with reference to FIG. 4, the method 200 may be at least in part implemented by means of hardware modules, including but not limited to: an integrated circuit (IC) chip, an application specific integrated circuit (ASIC) chip, a system on chip (SoC), etc.

In 202, a request for reading target data is received. In one example, a user may perform an operation (for example an I/O operation on a computer file system) on a computer (for example a host and/or a server) through a host adapter (HOST) other than the device 100. For example, when the I/O read operation is performed, the HOST sends a request for reading data to a mapping logic unit (MLU). The request may be a request for reading data for example in the MCC or the persistent storage device in the device 100.

In step 204, the target data is searched for by searching the data index generated in the cache for reading data. In one example, the target data may be searched for by searching the HASH structure in the MCC.

In step 206, the target data is provided. In one example, when the index entry of the target data is found in the MCC, the data may be found based on the index entry, and the data may be provided to the MLU to complete the read operation.

By for example using embodiments of the present disclosure, the data index in the cache may be used to search for and read the target data, so as to improve the efficiency of reading data.

Figure 3:
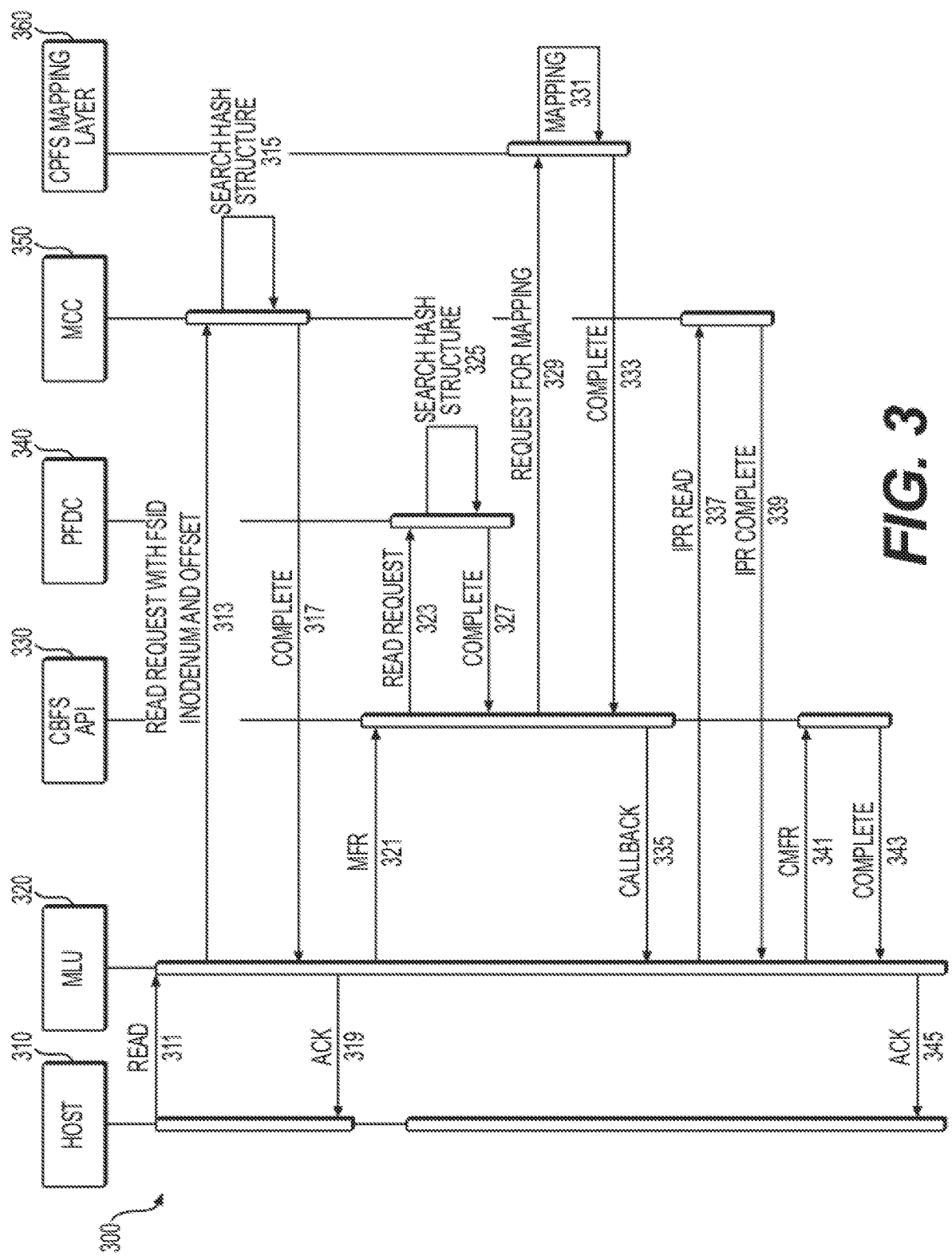
FIG. 3 is an example method for reading data according to one embodiment of the present disclosure.

FIG. 3 is a diagram of an example method 300 for reading data according to one embodiment of the present disclosure. FIG. 3 is a specific example of FIG. 2. In the embodiment as shown in FIG. 3, the user may perform an operation (for example an I/O operation on a computer file system) on a computer (for example a host and/or a server) through a HOST 310 other than the device 100. For example, when the I/O read operation are performed, the HOST 310 sends a read request to the MLU 320 at 311, and the read request for example may be a request for performing read on the MCC or the persistent storage device in the device 100.

At 313, in response to receiving the request, the MLU 320 sends the read request containing an FSID, an InodeNum and an Offset to the MCC 350. At 315, in response to receiving the read request, the MCC 350 may search the HASH table in the MCC 350 using the FSID, the InodeNum and the Offset. At 317, the MCC 350 then completes the search and returns the searched result back to the MLU 320. At 319, in response to the target data being found, the MLU 320 sends an acknowledgement character Ack to the HOST 310 so as to send the target data to the HOST 310.

If the MCC 350 does not find the target data in the HASH structure, the MLU 320 sends a request for mapping for read (Map_For_Read, MFR) to an application program interface 330 of a common block device file system (CBFS API) at 321. At 323, in response to receiving the MFR, the CBFS API 330 sends a read request to the PDFC 340. At 325, in response to receiving the read request, the PFDC 340 searches the HASH structure in the PFDC. At 327, the PFDC 340 then completes the search, and returns the searched result back to the CBFS API 330.

At 335, in response to a corresponding catalog of the target data being found in the PDFC, the CBFS API 330 calls back an address to the MLU 320, so as to provide the target data via the MLU 320 to the HOST 310. If the corresponding index catalog of the target data is not found in the PDFC, the CBFS API 330 sends a request for mapping to a CBFS mapping layer 360 at 329. At 331, in response to receiving the request, the CBFS mapping layer 360 performs the mapping operation for the data in the persistent storage device. At 333, the CBFS mapping layer 360 returns the mapping result back to the CBFS API 330. At 335, the CBFS API 330 then performs a callback operation to call back the address to the MLU 320, thereby providing the target data via the MLU 320 to the HOST 310.

At 337, the MLU 320 performs an I/O request packet (IPR) read operation on the MCC 350. At 339, the MCC 320 notifies the MLU 320 of completing the IPR read. At 341, the MLU 320 then sends a request for mapping for read (CMFR) to the CBFS API 330. At 343, in response to receiving the request, the CBFS API 330 performs the mapping for read and informs the MLU 320 of completing the operation. At 345, the MLU 320 sends the Ack acknowledgement character to the HOST, so as to send the target data to the HOST 310.

By means of providing the MCC 350 with an index catalog for reading target data, the target data may be returned directly by searching the index catalog, thereby reducing the operation of reading the target data and improving the efficiency of reading data.

Figure 4:
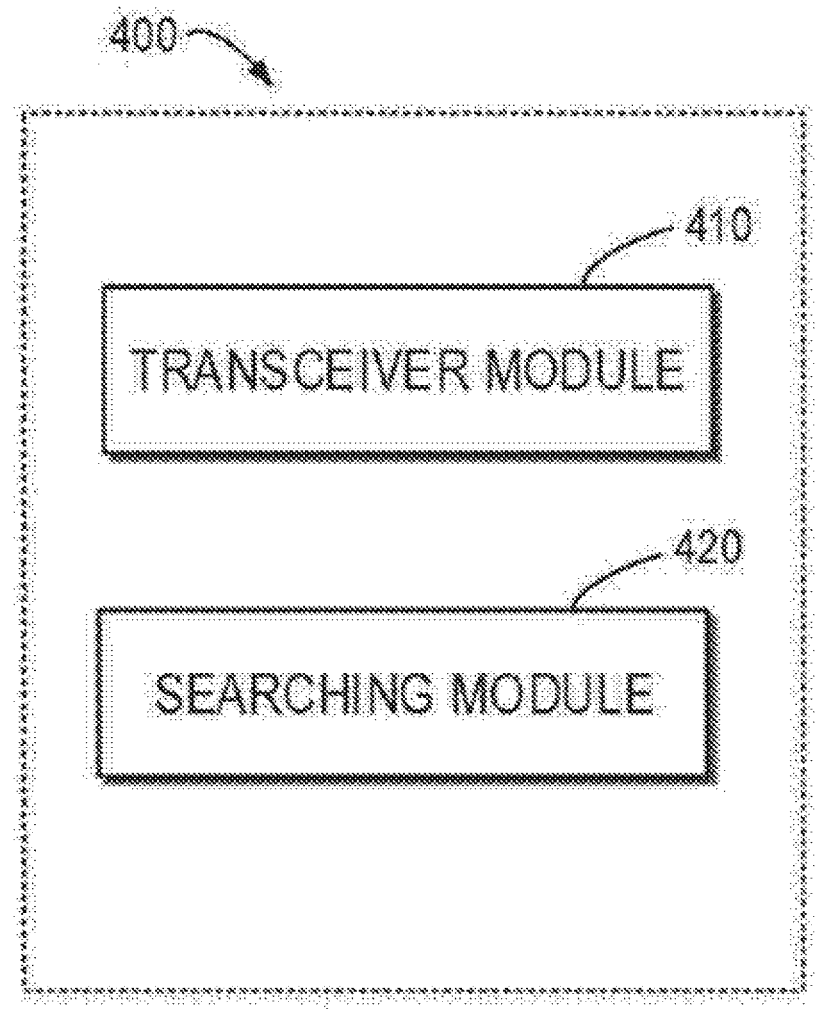
FIG. 4 is a block diagram illustrating an apparatus for reading data according to embodiments of the present disclosure.

FIG. 4 is a block diagram illustrating an apparatus 400 for managing a cache according to embodiments of the present disclosure. For example, the method 200 for managing a cache may be implemented by the apparatus 400. As shown in FIG. 4, the apparatus 400 may include a transceiver module 410 configured to receive a request for reading target data and provide the target data. The apparatus 400 may further include a searching module 420 configured to search for the target data by searching a data index generated in a cache for reading data.

For the sake of clarity, FIG. 4 does not show certain optional modules of the apparatus 400. However, it should be appreciated that each feature described above with reference to FIGS. 1-3 is also applicable to the apparatus 400. Moreover, each module of the apparatus 400 may be a hardware module, or may be a software module. For example, in certain embodiments, the apparatus 400 may be implemented partly or entirely using software and/or firmware, for example, be implemented as a computer program product containing in a computer readable medium. Alternatively or in addition, the apparatus 400 may be implemented partly or entirely based on hardware, for example, be implemented as an integrated circuit (IC), an application specific integrated circuit (ASIC), a system on chip (SoC), a field programmable gate array (FPGA), etc. The scope of the present disclosure is not limited in this regard.

The present disclosure may be a method, device, system and/or computer program product. The computer program product may comprise a computer readable storage medium which carries thereon computer readable program instructions for implementing each aspect of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical fibers transmission, wireless transmission, routers, firewalls, switches, gateway computers and/or edge servers. A network adapter card or network interface in each computing/processing device receives computer readable program instructions from the network, and forwards the computer readable program instructions for storage in a computer readable storage medium within the respective computing/processing device.

Computer program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the case relating to the remote computer, the remote computer may be connected to the user's computer through any type of network, including a local area network (LAN) or a wide area network (WAN), or may be connected to an external computer (for example, through the Internet using an Internet Service Provider). In some embodiments, electronic circuitry, for example, programmable logic circuitry, field-programmable gate arrays (FPGA), or programmable logic arrays (PLA), which may execute computer readable program instructions, may be customized by utilizing the state information of the computer readable program instructions, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, being executed by the processing unit of the computer or other programmable data processing apparatus, create an apparatus for implementing the functions/acts specified in the flowchart and/or block diagram block or blocks. These computer readable program instructions may also be stored in a computer readable storage medium, and direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable data processing apparatus or other device to produce a computer implemented process, such that the instructions, being executed on the computer, other programmable apparatus, or other device, implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, code segment, or portion of code, which comprises one or more executable instructions for implementing the specified logical function(s). In some alternative implementations, the functions noted in the block may occur in an order different from that noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for the purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or the technical improvement over technologies found in the marketplace, or to enable others of ordinary skilled in the art to understand the embodiments disclosed herein.

We claim:

1. A method for reading target data, comprising:
   receiving a request, at a mapping logic unit (MLU), for reading the target data in a cache;
   searching for the target data by searching a data index generated in the cache for reading data, wherein the MLU is configured to receive a result of the searching for the target data, wherein in response to the target data being unfound in the cache for reading data, sending a mapping for read (MFR) request from the MLU to an application program interface of a common block device file system (CBFS API), wherein in response to receiving the MFR request, sending a read request from the CBFS API to a persistent file data cache (PFDC), wherein in response to receiving the read request at the PFDC, searching for the target data in a HASH structure in the PFDC and returning a result of the searching to the CBFS API; and
   upon finding the target data, providing the target data to the MLU to complete a read operation.

2. The method according to claim 1, further comprising: updating the data index in the cache for reading data.

3. The method according to claim 2, wherein the updating the data index in the cache for reading data comprises:
   in response to data being written to the cache for reading data, generating an index entry for the written data; and
   updating the data index using the index entry.

4. The method according to claim 3, wherein the generating an index entry for the written data comprises:
   in response to the written data being renamed, generating the index entry based on a file system identifier, an index node identifier and an offset.

5. The method according to claim 2, wherein the updating the data index in the cache for reading data comprises:
   in response to the target data being stored in a persistent storage device, storing the target data in the cache for reading data;
   in response to the target data being stored in the cache for reading data, generating an index entry for the target data; and
   updating the data index using the index entry.

6. The method according to claim 1, wherein the searching for the target data further comprises:
   in response to the target data being unfound in the cache for reading data, searching the cache for writing data.

7. The method according to claim 6, wherein the searching for the target data further comprises:

in response to the target data being unfound in the cache for writing data, searching a persistent storage device.

8. An electronic device, comprising:
a processor;
a memory coupled to the processor and storing instructions to be executed by the processor, the instructions, when executed by the processor, causing the electronic device to perform actions including:
receiving a request, at a mapping logic unit (MLU), for reading a target data in a cache;
searching for the target data by searching a data index generated in the cache for reading data, wherein the MLU is configured to receive a result of the searching for the target data, wherein in response to the target data being unfound in the cache for reading data, sending a mapping for read (MFR) request from the MLU to an application program interface of a common block device file system (CBFS API), wherein in response to receiving the MFR request, sending a read request from the CBFS API to a persistent file data cache (PFDC), wherein in response to receiving the read request at the PFDC, searching for the target data in a HASH structure in the PFDC and returning a result of the searching to the CBFS API; and
upon finding the target data, providing the target data to the MLU to complete a read operation.

9. The electronic device according to claim 8, wherein the actions further includes:
updating the data index in the cache for reading data.

10. The electronic device according to claim 8, wherein the updating the data index in the cache for reading data comprises:
in response to data being written to the cache for reading data, generating an index entry for the written data; and
updating the data index using the index entry.

11. The electronic device according to claim 10, wherein the generating an index entry for the written data comprises:
in response to the written data being renamed, generating the index entry based on a file system identifier, an index node identifier and an offset.

12. The electronic device according to claim 9, wherein the updating the data index in the cache for reading data comprises:
in response to the target data being stored in a persistent storage device, storing the target data in the cache for reading data; in response to the target data being stored in the cache for reading data, generating an index entry for the target data; and updating the data index using the index entry.

13. The electronic device according to claim 8, wherein the searching for the target data further comprises:
in response to the target data being unfound in the cache for reading data, searching the cache for writing data.

14. The electronic device according to claim 13, wherein the searching for the target data further comprises:
in response to the target data being unfound in the cache for writing data, searching a persistent storage device.

15. A computer program product for reading target data, the computer program product comprising:
a non-transitory computer readable medium encoded with computer-executable program code, the code configured to enable the execution of:
receiving a request, at a mapping logic unit (MLU), for reading the target data in a cache;
searching for the target data by searching a data index generated in the cache for reading data, wherein the MLU is configured to receive a result of the searching for the target data, wherein in response to the target data being unfound in the cache for reading data, sending a mapping for read (MFR) request from the MLU to an application program interface of a common block device file system (CBFS API), wherein in response to receiving the MFR request, sending a read request from the CBFS API to a persistent file data cache (PFDC), wherein in response to receiving the read request at the PFDC, searching for the target data in a HASH structure in the PFDC and returning a result of the searching to the CBFS API; and
upon finding the target data, providing the target data to the MLU to complete a read operation.

16. The computer program product of claim 15, wherein the code is further configured to enable the execution of:
updating the data index in the cache for reading data.

17. The computer program product of claim 16, wherein the updating the data index in the cache for reading data comprises:
in response to data being written to the cache for reading data, generating an index entry for the written data; and
updating the data index using the index entry.

18. The computer program product of claim 17, wherein the generating an index entry for the written data comprises:
in response to the written data being renamed, generating the index entry based on a file system identifier, an index node identifier and an offset.

19. The computer program product of claim 16, wherein the updating the data index in the cache for reading data comprises:
in response to the target data being stored in a persistent storage device, storing the target data in the cache for reading data;
in response to the target data being stored in the cache for reading data, generating an index entry for the target data; and
updating the data index using the index entry.

20. The computer program product of claim 15, wherein the searching for the target data further comprises:
in response to the target data being unfound in the cache for reading data, searching the cache for writing data.

* * * * *